United States Patent
Carter et al.

(10) Patent No.: US 11,958,055 B2
(45) Date of Patent: Apr. 16, 2024

(54) REDUCED VIBRATION MOBILE MATERIAL PROCESSING PLANT

(71) Applicant: Terex USA, LLC, Westport, CT (US)

(72) Inventors: Rex Mikle Carter, Newcastle, OK (US); Edwin J. Sauser, Monticello, IA (US); Alexander Evan Ross, Washington, IA (US)

(73) Assignee: Terex USA, LLC, Westport, CT (US)

( * ) Notice: Subject to any disclaimer, the term of this patent is extended or adjusted under 35 U.S.C. 154(b) by 330 days.

(21) Appl. No.: 17/097,021

(22) Filed: Nov. 13, 2020

(65) Prior Publication Data

US 2021/0146374 A1 May 20, 2021

Related U.S. Application Data

(60) Provisional application No. 62/935,313, filed on Nov. 14, 2019.

(51) Int. Cl.
*B02C 21/02* (2006.01)
*B02C 2/00* (2006.01)
*B60S 9/12* (2006.01)
*B66F 3/46* (2006.01)
*E01C 19/05* (2006.01)

(52) U.S. Cl.
CPC .............. *B02C 21/02* (2013.01); *B60S 9/12* (2013.01); *B66F 3/46* (2013.01); *E01C 19/05* (2013.01); *B02C 2/00* (2013.01)

(58) Field of Classification Search
CPC ....... B02C 21/02; B02C 2/00; B60S 9/02–12; B65D 90/14; B65D 88/30; B65D 88/32
See application file for complete search history.

(56) References Cited

U.S. PATENT DOCUMENTS

| 3,409,235 | A | * | 11/1968 | Quinn | ...................... B02C 21/02 |
| | | | | | 241/101.76 |
| 4,817,877 | A | * | 4/1989 | Itoh | ...................... B02C 18/0007 |
| | | | | | 241/34 |
| 2005/0236824 | A1* | | 10/2005 | Wissler | ...................... B60S 9/10 |
| | | | | | 280/765.1 |

FOREIGN PATENT DOCUMENTS

CN 106269039 A * 1/2017

OTHER PUBLICATIONS

CHEN, Translation of CN-106269039 (Year: 2017).*

* cited by examiner

*Primary Examiner* — Bobby Yeonjin Kim
(74) *Attorney, Agent, or Firm* — Simmons Perrine Moyer Bergman PLC

(57) ABSTRACT

A mobile cone plant with canted run-on jacks for limited vibration of the chassis without a need for clamping or extremely tight tolerances in telescopic jack parts.

6 Claims, 3 Drawing Sheets

US 11,958,055 B2

REDUCED VIBRATION MOBILE MATERIAL PROCESSING PLANT

CROSS REFERENCE TO RELATED APPLICATIONS

The present application claims the benefit of the filing date of provisional patent application having Ser. No. 62/935,313 filed on Nov. 14, 2019 by the same inventors entitled Canted Hydraulic Leg Design, which application is incorporated herein in its entirety by this reference.

FIELD OF THE INVENTION

The present invention generally relates to systems and methods for mobile rock crushing and/or screening plants.

BACKGROUND OF THE INVENTION

This invention relates to mobile rock crushing and/or screening plants. A portable rock crushing and/or screening processing plant is either a single crusher or screen or a collection of several units, each performing various material processing functions to prepare aggregate materials for use for, but not limited to, concrete and asphalt products. The various units can perform various stages of crushing, screening, conveying, and washing of aggregate and recycle materials. Portability is achieved by positioning the plants on towable or haulable modules, so that the plant can service multiple locations where processed materials can be produced.

Many plants have utilized with run-on and/or leveling jacks to level the crusher or screen and/or reduce vibration of the plant.

While such systems have enjoyed some commercial success in the industry, they have drawbacks.

Traditionally, these jacks will wiggle due to clearances between telescoping portions of the jack. One method of reducing the vibration in such systems was to provide some type of structure to clamp together or otherwise limit the vibration induced relative motion of the telescoping jack portions after the jack length has been adjusted to a desired configuration. These approaches require some extra structure, such as pins and pin receiving members, clamps, etc. to achieve this result. Moreover, it requires time to make the required actions to clamp or otherwise limit the motion.

Consequently, there is a need for improvement in portable material processing equipment which eliminates or greatly reduces vibration and extra labor required each time a mobile plant is adjusted, reconfigured and/or deployed in a new location.

SUMMARY OF THE INVENTION

More specifically, an object of the invention is to provide efficient mobile material processing plants.

It is a feature of the present invention to include a plurality of canted run-on and/or leveling jacks.

It is another feature of the present invention to include a plurality of rubber isolation mounts for the material processing plant.

It is an advantage of the present invention to decrease the vibration of the plant without substantially adversely affecting the cost and efficiency of use of the system.

It is yet another feature to have a processing plant which is free of any structure which is configured for reducing vibration induced relative movement between top and bottom portions of run-on telescopic jacks.

The present invention includes the above-described features and achieves the aforementioned objects and advantages.

Accordingly, the present invention comprises the steps of:
providing a first frame support member 110 having a first frame longitudinal axis;
providing a material processing plant of the type which creates vibration during operation;
providing a first mount between the first frame support member 110 and the material processing plant; and
providing a first front telescoping jack 120 with a first front telescoping jack top portion 221 and a first front telescoping jack bottom portion 220, with first front telescoping jack longitudinal axis which is not coplanar with said first frame support member 110, said first front telescoping jack 120 is sized, located and configured to provide some support of the material processing plant.

Additionally, the present invention comprises:
a chassis,
a group of tandem dual wheels coupled to the chassis,
a cone crusher disposed on the chassis; and
a plurality of jacks, each of which is not oriented substantially perpendicular with respect to a longitudinal axis of said chassis.

BRIEF DESCRIPTION OF THE DRAWINGS

In the following description of the drawings, like reference numerals are employed to indicate like parts, in the various views.

DETAILED DESCRIPTION OF THE DRAWINGS

Figure 1:
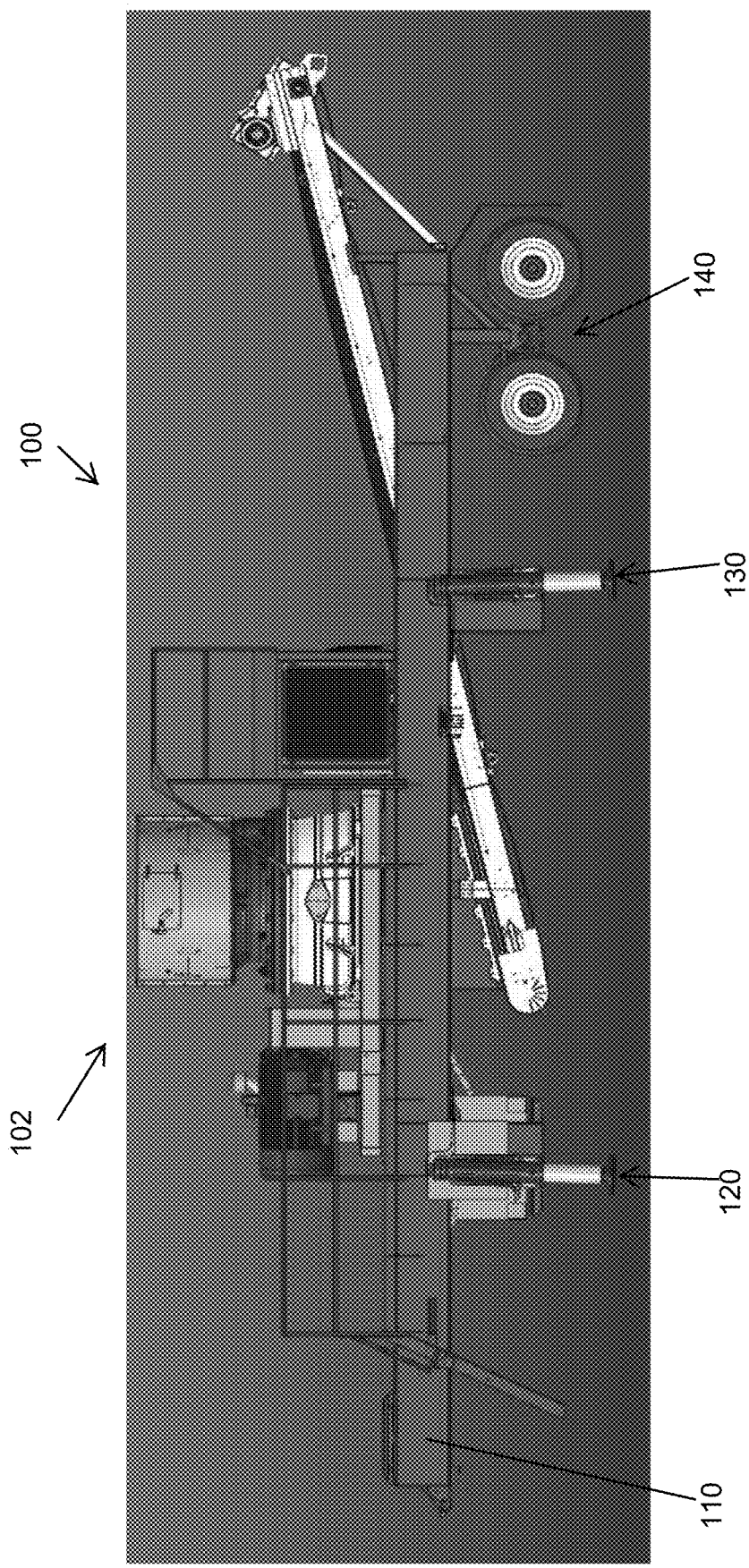
FIG. 1 is a side view of a system of the present invention.

Now referring to the drawings where like numerals refer to like matter throughout, and more specifically to FIG. 1, there is shown a vibration reduced material processing plant 100 having a cone crusher 102, however other high vibration material processing plants could be substituted, such as vibrating screens, trommels, grizzly bars, and other suitable plants, supported in part by a first frame support member 110 which is shown with first front telescoping jack 120 having a first front telescoping jack longitudinal axis and first rear telescoping jack 130 having a first rear telescoping jack longitudinal axis. Jacks 120 and 130 are shown as hydraulic jacks, but non-hydraulic mechanical jacks might be preferred in some applications. Since vibration reduced material processing plant 100 is mobile, there is also shown a first side rear tandem dual wheel group 140. The first frame support member 110 is assumed to be horizontal and the first front telescoping jack 120 and the first rear telescoping jack 130 are not vertical with respect to the first frame support member 110. The points where first front telescoping jack 120 and first rear telescoping jack 130 are coupled to the first frame support member 110 are closer to each other than the points where first front telescoping jack 120 and first rear telescoping jack 130 contact the ground. In other words, first front telescoping jack longitudinal axis is upwardly angled toward the cone crusher 102 and the first rear telescoping jack longitudinal axis is also upwardly angled toward the cone crusher 102 and each is closer to the other as they go further upward as shown in this FIG. 1.

Figure 2:
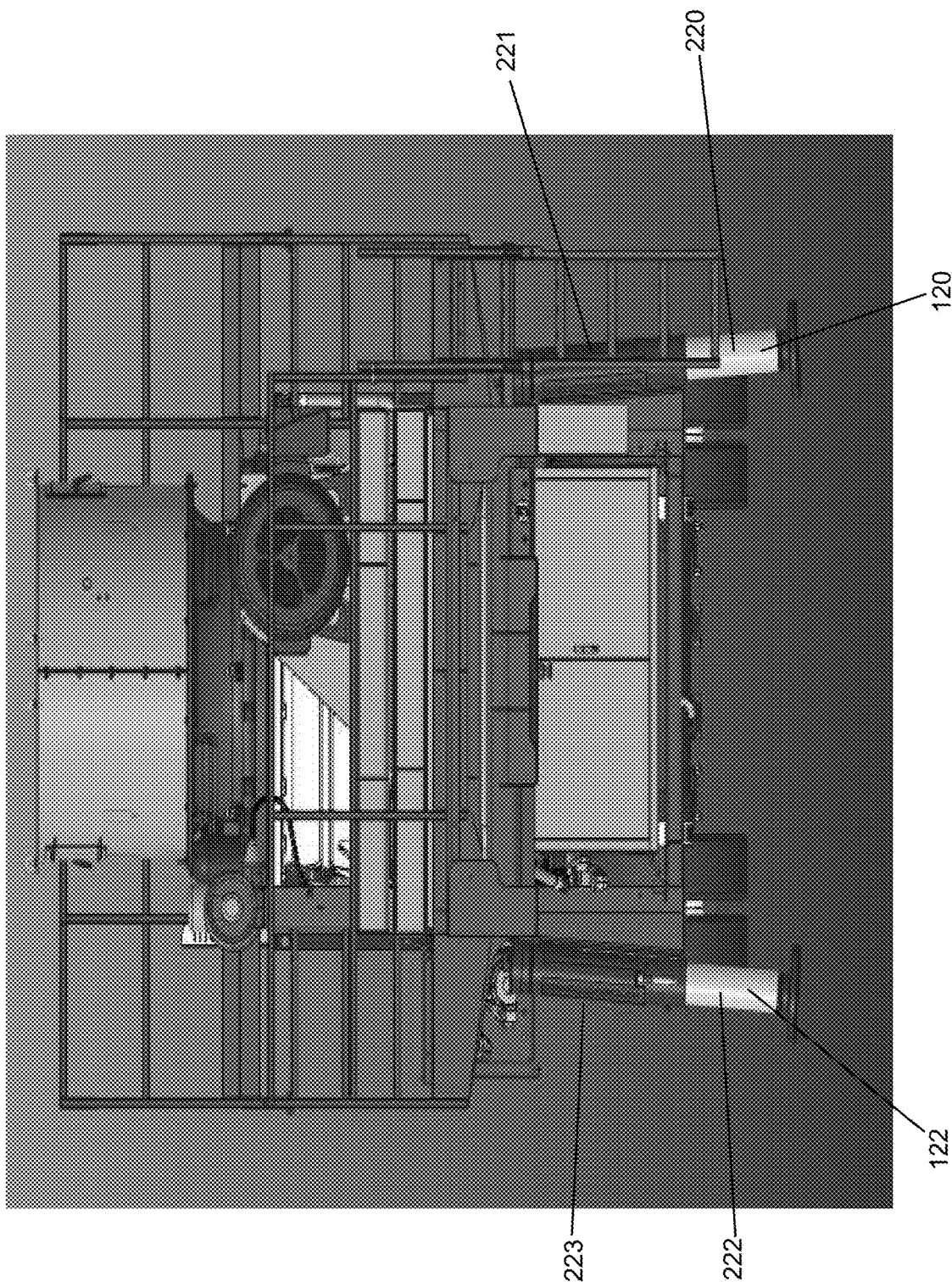
FIG. 2 is a front end view of a portion of FIG. 1.

Now referring to FIG. 2, there is shown a front end view of the vibration reduced material processing plant 100 of FIG. 1 where the first front telescoping jack 120 is shown having a first front telescoping jack bottom portion 220 and a first front telescoping jack top portion 221. There is also shown second front telescoping jack 122 which has a second front telescoping jack bottom portion 222 and a second front telescoping jack top portion 223. This front end view clearly shows the first front telescoping jack longitudinal axis being upwardly inclined toward the cone crusher 102. Similarly, the second front telescoping jack longitudinal axis is upwardly inclined toward the cone crusher 102 and each axis is closer to the other as they go further upward, as shown in this FIG. 2. In other words, the top portion of each second front telescoping jack 122 and first front telescoping jack 120 are closer to each other than their bottom portions are.

Figure 3:
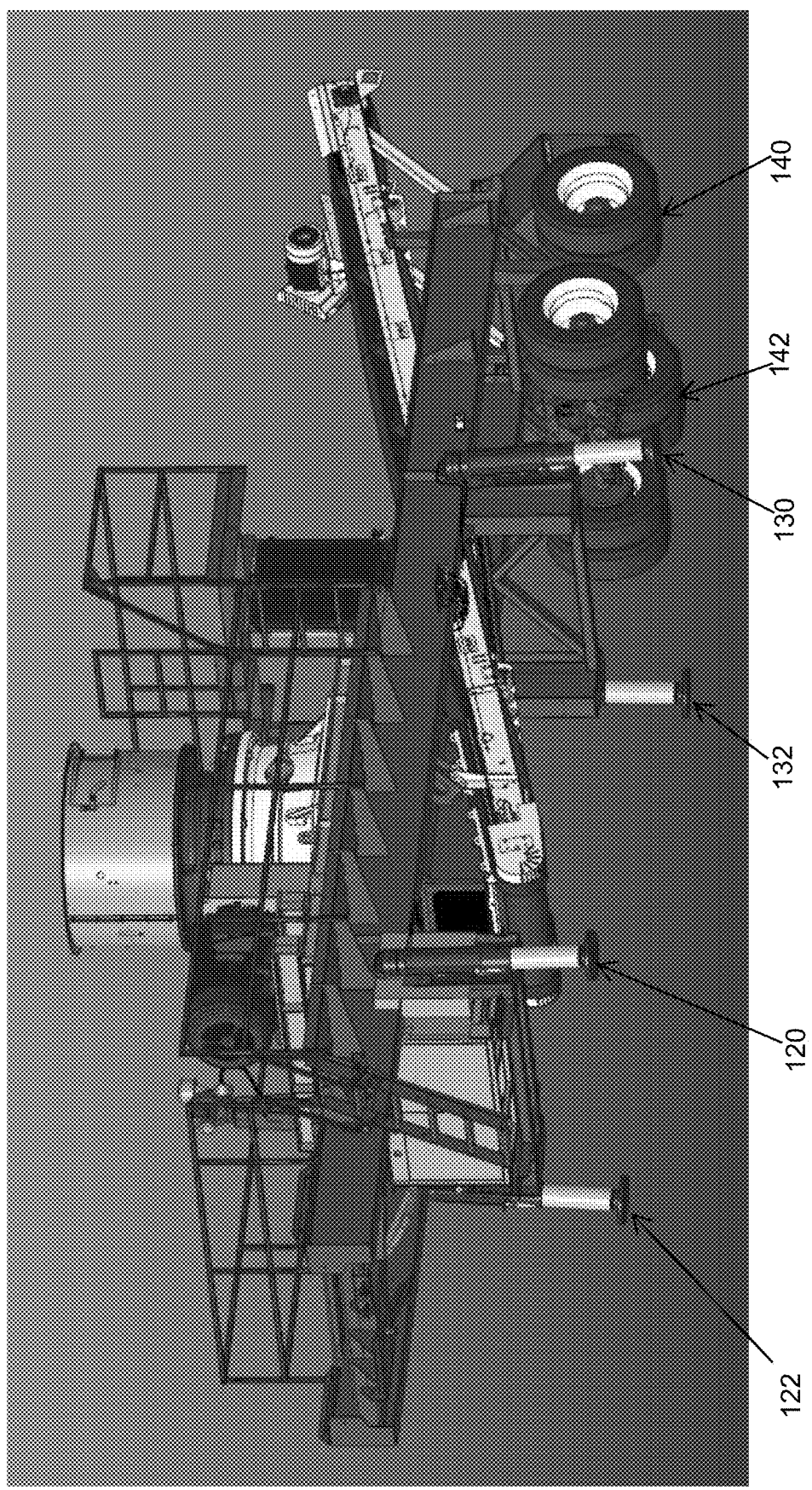
FIG. 3 is a perspective view of the system of FIGS. 1 and 2 with the canted jacks being disposed in non-transport configuration.

Now referring to FIG. 3, there is shown a perspective view of the vibration reduced material processing plant 100, which includes second rear telescoping jack 132. There is also shown a first side rear tandem dual wheel group 140 and a second side rear tandem dual wheel group 142. In this FIG. 3, it can be seen that the uppermost top portions of any two jacks are closer to each other than are their lowermost bottom portions. In some embodiments, the longitudinal axes of the jacks might be directed toward an apex centrally located above a central portion of the cone crusher 102.

In operation, the cone crusher 102 in a preferred embodiment may be a style of crusher that is not dynamically balanced about a vertical axis through the crusher. Cone crusher 102 is preferably mounted on rubber isolation mounts. Because of the unbalanced crusher, there is a resulting lateral force transmitted to the chassis including the first frame support member 110. During operation, this lateral force is rotating radially around the vertical axis through the cone crusher 102 center so the jacks 120, 122, 130 and 132 all experience a lateral force in all directions.

The jacks, with their canted or upwardly and inwardly angled axes, apply opposing lateral force which offsets some, if not all, of the lateral force transmitted through the rubber isolation mounts from the unbalanced crusher. The jacks are all slightly tilted toward the center so they can resist the forces in both side to side and also in end to end direction. With enough of this tilt, the lateral force from the leaning jacks is sufficient to prevent the telescoping portions of each of the jacks from moving relative to each other so that the normal fixes of having very tight clearances in the top and bottom portions of the jacks or clamping structures are not needed to hold the chassis from moving significantly.

The figures show a plurality of four jacks, which may be preferred but any number of a plurality of jacks will provide at least some of the benefits as described herein.

It is believed that when these teachings are combined with the known prior art by a person skilled in the art of mobile rock crushing and screening operations and equipment manufacture, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

We claim:

1. A method of deploying a mobile material processing plant comprising the steps of:
   providing a first frame support member having a first frame longitudinal axis;
   providing a material processing plant which creates vibration during operation;
   providing a first rubber isolation mount between the first frame support member and the material processing plant;
   providing a first front telescoping jack with a first front telescoping jack top portion and a first front telescoping jack bottom portion, with first front telescoping jack longitudinal axis which is not co-planar with said first frame support member, said first front telescoping jack is sized, located and configured to provide some support of the material processing plant;
   wherein said material processing plant is a cone crusher;
   providing a second front telescoping jack with a second front telescoping jack longitudinal axis, where said first front telescoping jack longitudinal axis and said second front telescoping jack longitudinal axis are upwardly and inwardly inclined;
   providing a first rear telescoping jack, with a first rear telescoping jack longitudinal axis and a second rear telescoping jack with a second rear telescoping jack longitudinal axis; and
   wherein each of said jacks is free of any structure configured to limit vibration induced internal jack relative motions.

2. The method of claim 1 wherein each of said jacks is not vertical with respect to the first frame support member.

3. The method of claim 1 wherein each of said jacks is canted.

4. The method of claim 1 wherein each of said jacks is oriented so that a top portion of each jack is closer to a top portion of any other of said jacks than are their respective bottom portions.

5. The method of claim 1 wherein bottom portions of each jack are splayed apart.

6. The method of claim 2 wherein each of said jacks is canted, each of said jacks is oriented so that a top portion of each jack is closer to a top portion of any other of said jacks than are their respective bottom portions, wherein bottom portions of each jack are splayed apart, and wherein each of said jacks is tilted toward a central point so as to resist forces in both side to side and also in end to end directions.

\* \* \* \* \*